United States Patent
Liu et al.

(10) Patent No.: US 8,761,150 B2
(45) Date of Patent: Jun. 24, 2014

(54) METHOD AND APPARATUS FOR DATA-CENTRIC MULTIPLEXING AND ASYNCHRONOUS COMMAND INTERFACE TO THE ENCODER AND MULTIPLEXER MODULES

(75) Inventors: Jingyuan Liu, Morris Plains, NJ (US); Chenglin Cui, Succasunna, NJ (US); David G. Thuel, Middletown, NJ (US); Vikram R. Anreddy, Bridgewater, NJ (US); Bhupinder S. Parhar, Belle Mead, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 660 days.

(21) Appl. No.: 12/415,895

(22) Filed: Mar. 31, 2009

(65) Prior Publication Data
US 2009/0245208 A1 Oct. 1, 2009

Related U.S. Application Data

(63) Continuation-in-part of application No. 12/328,672, filed on Dec. 4, 2008.

(60) Provisional application No. 60/992,461, filed on Dec. 5, 2007, provisional application No. 61/040,758, filed on Mar. 31, 2008, provisional application No. 61/040,775, filed on Mar. 31, 2008.

(51) Int. Cl.
| | |
|---|---|
| H04J 3/06 | (2006.01) |
| H04L 12/54 | (2013.01) |
| H04W 28/14 | (2009.01) |
| H04W 56/00 | (2009.01) |
| H04L 12/40 | (2006.01) |

(52) U.S. Cl.
CPC ............ *H04W 28/14* (2013.01); *H04W 56/001* (2013.01); *H04L 12/4015* (2013.01)
USPC ........... 370/350; 370/429; 370/503; 370/506; 370/509; 370/537

(58) Field of Classification Search
None
See application file for complete search history.

(56) References Cited

U.S. PATENT DOCUMENTS

| | | | |
|---|---|---|---|
| 5,883,529 A | 3/1999 | Kumata et al. | |
| 7,012,650 B2 * | 3/2006 | Hu et al. | 348/515 |
| 7,949,012 B2 | 5/2011 | Chang et al. | |

(Continued)

FOREIGN PATENT DOCUMENTS

| | | |
|---|---|---|
| EP | 1811734 | 7/2007 |
| JP | 10336602 | 12/1998 |

(Continued)

OTHER PUBLICATIONS

International Search Report & Written Opinion—PCT/US2008/085698, International Search Authority—European Patent Office—Mar. 25, 2009.

(Continued)

*Primary Examiner* — Yemane Mesfin
*Assistant Examiner* — Christine Duong
(74) *Attorney, Agent, or Firm* — Stanton Braden

(57) ABSTRACT

An apparatus and method for data centric multiplexing in a wireless communication system with a plurality of channels comprising assigning a first resource to a first of the plurality of channels; assigning a second resource to a second of the plurality of channels wherein the second resource is not the first resource; assigning a third resource to a third of the plurality of channels wherein the third resource is not the first or the second resource; and assigning a fourth resource to a fourth of the plurality of channels by puncturing at least one of the first, second or third resources and skipping the rest of unpunctured first, second or third resources. Further disclosed are apparatus and method for an asynchronous command interface to an encoder and multiplexer module in a wireless communication system.

13 Claims, 8 Drawing Sheets

(56) References Cited

U.S. PATENT DOCUMENTS

| | | |
|---|---|---|
| 8,169,947 B2 | 5/2012 | Liu et al. |
| 2003/0120705 A1* | 6/2003 | Chen et al. .................. 709/104 |
| 2006/0104368 A1 | 5/2006 | Okuyama et al. |
| 2007/0097927 A1 | 5/2007 | Gorokhov et al. |
| 2007/0129079 A1 | 6/2007 | Schwarz et al. |
| 2009/0046694 A1 | 2/2009 | Matsumoto et al. |
| 2009/0052381 A1 | 2/2009 | Gorokhov et al. |

FOREIGN PATENT DOCUMENTS

| | | |
|---|---|---|
| JP | 2004529527 T | 9/2004 |
| JP | 2005333412 | 12/2005 |
| KR | 20070077008 A | 7/2007 |
| WO | WO0069197 | 11/2000 |
| WO | 02058300 A1 | 7/2002 |
| WO | 2007052767 A1 | 5/2007 |

OTHER PUBLICATIONS

International Search Report & Written Opinion—PCT/US2009/039036, International Search Authority—European Patent Office—Jul. 7, 2009.

Taiwan Search Report—TW097147578—TIPO—Mar. 21, 2012.

* cited by examiner

METHOD AND APPARATUS FOR DATA-CENTRIC MULTIPLEXING AND ASYNCHRONOUS COMMAND INTERFACE TO THE ENCODER AND MULTIPLEXER MODULES

CLAIM OF PRIORITY UNDER 35 U.S.C. §119

The present application for patent is a Continuation-In-Part of U.S. Ser. No. 12/328,672, Dec. 4, 2008, which claims priority to Provisional Application No. 60/992,461 entitled Data-Centric MUX Engine Architecture filed on Dec. 5, 2007, and assigned to the assignee hereof and hereby expressly incorporated by reference herein. Additionally, the present application for patent claims priority to Provisional Application No. 61/040,758 entitled Data-Centric MUX Engine Architecture filed on Mar. 31, 2008, and assigned to the assignee hereof and hereby expressly incorporated by reference herein and to Provisional Application No. 61/040,775 entitled Asynchronous Command Interface to the Encoder and Multiplexer Modules filed on Mar. 31, 2008 and assigned to the assignee hereof and hereby expressly incorporated herein.

FIELD

This disclosure relates generally to apparatus and methods for multiplexing. More particularly, the disclosure relates to data-centric multiplexing of wireless communication channels.

BACKGROUND

Wireless communication systems are widely deployed to provide various types of communication content such as voice, dat, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP LTE systems, and orthogonal frequency division multiple access (OFDMA) systems.

Generally, a wireless multiple-access communications system can simultaneously support communication for multiple wireless terminals. Each terminal communicates with one or more base stations via transmissions on the forward and reverse links. The forward ling (or downlink) refers to the communication link from the base stations to the terminals (e.g., a mobile station), and the reverse link (or uplink) refers to the communication link from the terminal to the base stations. This communication link may be established via a single input-single output, multiple input-single output or multiple-input-multiple output (MIMO) system.

A MIMO system employs multiple ($N_T$) transmit antennas and multiple ($N_R$) receive antennas for data transmission. A MIMO channel formed by the $N_T$ transmit and $N_R$ receive antennas may be decomposed into Ns independent channels, which are also referred to as spatial channels, where $N_S \leq \min\{N_T, N_R\}$. Each of the Ns independent channels corresponds to a dimension. The MIMO system can provide improved performance (e.g., higher throughput and/or greater reliability) if the additional dimensionalities created by the multiple transmit and receive antennas are utilized. For example, a MIMO system can support time division duplex (TDD) and frequency division duplex (FDD) systems. In a TDD system, the forward and reverse link transmissions are on the same frequency region so that the reciprocity principle allows the estimation of the forward link channel from the reverse link channel. This enables the access point to extract transmit beamforming gain on the forward link when multiple antennas are available at the access point.

Today's broadband wireless systems require efficient and powerful hardware, for example, application specific integrated circuits (ASIC), to support high rate data communications and also require highly flexible apparatus to support varied control channels. Data channels usually employ standard modulation techniques, such as quadrature phase shift keying (QPSK), quadrature amplitude modulation (QAM) etc. However the control channels, including different pilot channels, require special treatment. Control channels are low throughput in nature but require high reliability. As a result, control channels often use special modulation schemes, irregular and varied tones/orthogonal frequency division multiplex (OFDM) symbols resource allocation, channel specific hopping, and the reuse of tone resources among different channels. Moreover, as part of wireless standard evolution, the control channels are often modified over time. Also the control channel formats between different standards, such as Ultra Mobile Broadband (UMB) and Long Term Evolution (LTE), are very different and flexibility in a system to adapt to one or the other is needed for versatility.

SUMMARY

Disclosed is an apparatus and method for data-centric multiplexing. According to one aspect, a method for data centric multiplexing in a wireless communication system with a plurality of channels comprising assigning a first resource to a first of the plurality of channels; assigning a second resource to a second of the plurality of channels wherein the second resource is not the first resource; assigning a third resource to a third of the plurality of channels wherein the third resource is not the first or the second resource; and assigning a fourth resource to a fourth of the plurality of channels by puncturing at least one of the first, second or third resources and skipping the rest of unpunctured first, second or third resources.

According to another aspect, a method used in wireless communication system, the method comprising encoding data bits to produce symbols to be transmitted in a data channel; specifying symbols without an encoding step to be transmitted in a control channel; generating a tile descriptor for designating tones to be used for the data channel and the control channel transmissions; generating a channel priority parameter to determine which one of the data or control channels paints on at least one of the tones first; generating a tone marker to identify which one of the data or control channels occupies one of the tones; generating a puncture bitmap to determine if one of the data or control channels can be punctured by another one of the data or control channels that is designated for the same tone; and multiplexing the data channel and the control channel for transmission according to at least one of the tile descriptor, the channel priority, the tone marker or the puncture bitmap.

According to another aspect, an apparatus for data centric multiplexing, the apparatus comprising a processor and circuitry configured to: assign a first resource to a first of the plurality of channels; assign a second resource to a second of the plurality of channels wherein the second resource is not the first resource; assign a third resource to a third of the plurality of channels wherein the third resource is not the first or the second resource; and assign a fourth resource to a fourth of the plurality of channels by puncturing at least one of the first, second or third resources and skipping the rest of unpunctured first, second or third resources.

According to another aspect, an apparatus comprising a processor and a memory, the memory containing program code executable by the processor for performing the following: encoding data bits to produce symbols to be transmitted in a data channel; specifying symbols without an encoding step to be transmitted in a control channel; generating a tile descriptor for designating tones to be used for the data channel and the control channel transmissions; generating a channel priority parameter to determine which one of the data or control channels paints on at least one of the first; generating a tone marker to identify which one of the data or control channels occupies one of the tone; generating a puncture bitmap to determine if one of the data or control channels can be punctured by another one of the data or control channels that is designated for the same tone; and multiplexing the data channel and the control channel for transmission according to at least one of the tile descriptor, the channel priority, the tone marker or the puncture bitmap.

According to another aspect, an apparatus for data centric multiplexing, the apparatus comprising means for assigning a first resource to a first of the plurality of channels; means for assigning a second resource to a second of the plurality of channels wherein the second resource is not the first resource; means for assigning a third resource to a third of the plurality of channels wherein the third resource is not the first or the second resource; and means for assigning a fourth resource to a fourth of the plurality of channels by puncturing at least one of the first, second or third resources and skipping the rest of unpunctured first, second or third resources.

According to another aspect, an apparatus for data centric multiplexing, the apparatus comprising means for encoding data bits to produce symbols to be transmitted in a data channel; means for specifying symbols without an encoding step to be transmitted in a control channel; means for generating a tile descriptor for designating tones to be used for the data channel and the control channel transmissions; means for generating a channel priority parameter to determine which one of the data or control channels paints on at least one of the tones first; means for generating a tone marker to identify which one of the data or control channels occupies one of the tone; means for generating a puncture bitmap to determine if one of the data or control channels can be punctured by another one of the data or control channels that is designated for the same tone; and means for multiplexing the data channel and the control channel for transmission according to at least one of the tile descriptor, the channel priority, the tone marker or the puncture bitmap.

According to another aspect, a computer-readable medium including program code stored thereon, comprising program code for assigning a first resource to a first of the plurality of channels; program code for assigning a second resource to a second of the plurality of channels wherein the second resource is not the first resource; program code for assigning a third resource to a third of the plurality of channels wherein the third resource is not the first or the second resource; and program code for assigning a fourth resource to a fourth of the plurality of channels by puncturing at least one of the first, second or third resources and skipping the rest of unpunctured first, second or third resources.

According to another aspect, a computer-readable medium including program code stored thereon, comprising program code for encoding data bits to produce symbols to be transmitted in a data channel; program code for specifying symbols without an encoding step to be transmitted in a control channel; program code for generating a tile descriptor for designating tones to be used for the data channel and the control channel transmissions; program code for generating a channel priority parameter to determine which one of the data or control channels paints on at least one of the tones first; program code for generating a tone marker to identify which one of the data or control channels occupies one of the tone; program code for generating a puncture bitmap to determine if one of the data or control channels can be punctured by another one of the data or control channels that is designated for the same tone; and program code for multiplexing the data channel and the control channel for transmission according to at least one of the tile descriptor, the channel priority, the tone marker or the puncture bitmap.

Further disclosed are apparatus and method for an asynchronous command interface to an encoder and multiplexer module in a wireless communication system. According to one aspect, a method for loosely or coarsely synchronizing constraints between an encoder and a multiplexer hardware and associated firmware is disclosed. Thus, according to an aspect a method used in wireless communication system, the method comprising synchronizing an encoder and a multiplexer up to a frame; pushing jobs from the encoder into a pending queue; determining if the jobs in the pending queue are from the frame; pushing jobs from the pending queue to an active queue if the jobs are from the same frame; and multiplexing the jobs from the same frame.

According to another aspect, an apparatus operable in wireless communication system, the apparatus comprising means for synchronizing an encoder and a multiplexer up to a frame; means for pushing jobs from the encoder into a pending queue; means for determining if the jobs in the pending queue are from the frame; means for pushing jobs from the pending queue to an active queue if the jobs are from the same frame; and means for multiplexing the jobs from the same frame.

According to another aspect, there is disclosed a machine-readable medium comprising instructions which, when executed by a machine, cause the machine to perform operations including synchronizing an encoder and a multiplexer up to a frame; pushing jobs from the encoder into a pending queue; determining if the jobs in the pending queue are from the frame; pushing jobs from the pending queue to an active queue if the jobs are from the same frame; and multiplexing the jobs from the same frame.

According to another aspect, there is disclosed an apparatus operable in a wireless communication system, the apparatus comprising a processor, configured to: synchronize an encoder and a multiplexer up to a frame; push jobs from the encoder into a pending queue; determine if the jobs in the pending queue are from the frame; push jobs from the pending queue to an active queue if the jobs are from the same frame; and multiplex the jobs from the same frame; and a memory coupled to the processor for storing data.

Advantages of the present disclosure include versatility to allow adapting of special modulation schemes, irregular and varied tones/orthogonal frequency division multiplex (OFDM) symbols resource allocation, channel specific hopping, and the reuse of tone resources among different channels without requirement of massive hardware modification. An additional advantage is the ability to vary control channel formats between different standards.

It is understood that other aspects will become readily apparent to those skilled in the art from the following detailed description, wherein it is shown and described various aspects by way of illustration. The drawings and detailed description are to be regarded as illustrative in nature and not as restrictive.

DETAILED DESCRIPTION

Figure 1:
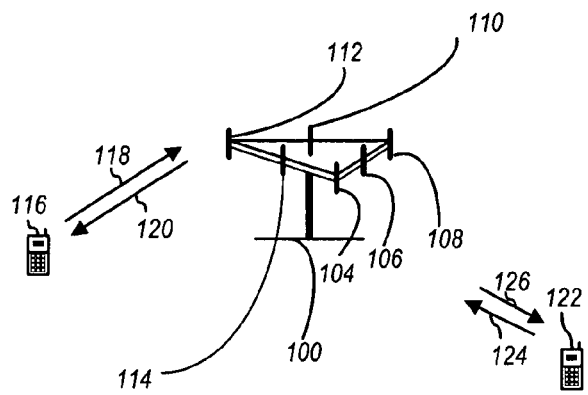
FIG. 1 is a block diagram illustrating an example of a multiple access wireless communication system.

The detailed description set forth below in connection with the appended drawings is intended as a description of various aspects of the present disclosure and is not intended to represent the only aspects in which the present disclosure may be practiced. Each aspect described in this disclosure is provided merely as an example or illustration of the present disclosure, and should not necessarily be construed as preferred or advantageous over other aspects. The detailed description includes specific details for the purpose of providing a thorough understanding of the present disclosure. However, it will be apparent to those skilled in the art that the present disclosure may be practiced without these specific details. In some instances, well-known structures and devices are shown in block diagram form in order to avoid obscuring the concepts of the present disclosure. Acronyms and other descriptive terminology may be used merely for convenience and clarity and are not intended to limit the scope of the disclosure.

While for purposes of simplicity of explanation, the methodologies are shown and described as a series of acts, it is to be understood and appreciated that the methodologies are not limited by the order of acts, as some acts may, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

The techniques described herein may be used for various wireless communication systems such as Code Division Multiple Access (CDMA) systems, Time Division Multiple Access (TDMA) systems, Frequency Division Multiple Access (FDMA) systems, Orthogonal FDMA (OFDMA) systems, Single-Carrier FDMA (SC-FDMA) systems, etc. The terms "systems" and "networks" are often used interchangeably. A CDMA system may implement a radio technology such as Universal Terrestrial Radio Access (UTRA), cdma2000, etc. UTRA includes Wideband-CDMA (W-CDMA) and Low Chip Rate (LCR). Cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). Cdma2000 is described in documents from an organization named "3rd Generation Partnership Project 2" (3GPP2). These various radio technologies and standards are known in the art.

Additionally, single carrier frequency division multiple access (SC-FDMA), which utilizes single carrier modulation and frequency domain equalization is another wireless communication technique. A SC-FDMA system can have similar performance and the same overall complexity as those of an OFDMA system. SC-FDMA signal has lower peak-to-average power ratio (PAPR) because of its inherent single carrier structure. SC-FDMA has drawn great attention, especially in uplink communications where lower PAPR greatly benefits the mobile terminal in terms of transmit power efficiency. Using SC-FDMA technique is currently a working assumption for uplink multiple access scheme in 3GPP Long Term Evolution (LTE), or Evolved UTRA. All of the above wireless communication techniques and standards may be used with the data centric multiplexing algorithms described herein.

FIG. 1 is a block diagram illustrating an example of a multiple access wireless communication system. As illustrated in FIG. 1, an access point 100 (AP) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal 122 is in communication with antennas 106 and 108, where antennas 106 and 108 transmit information to access terminal 122 over forward link 126 and receive information from access terminal 122 over reverse link 124. In a FDD system, communication links 118, 120, 124 and 126 may use different frequency for communication. For example, forward link 120 may use a different frequency then that used by reverse link 118. Each group of antennas and/or the area in which they are designed to communicate is often referred to as a sector of the access point. In one example, antenna groups each are designed to communicate to access terminals in a sector, of the areas covered by access point 100.

In communication over forward links 120 and 126, the transmitting antennas of access point 100 utilize beamforming in order to improve the signal-to-noise ratio of forward links for the different access terminals 116 and 124. Also, an access point using beamforming to transmit to access terminals scattered randomly through its coverage causes less interference to access terminals in neighboring cells than an access point transmitting through a single antenna to all its access terminals. An access point may be a fixed station. An access point may also be referred to as an access node, a base station or some other similar terminology known in the art. An access terminal may also be called a mobile station, a user equipment (UE), a wireless communication device or some other similar terminology known in the art.

Figure 2:
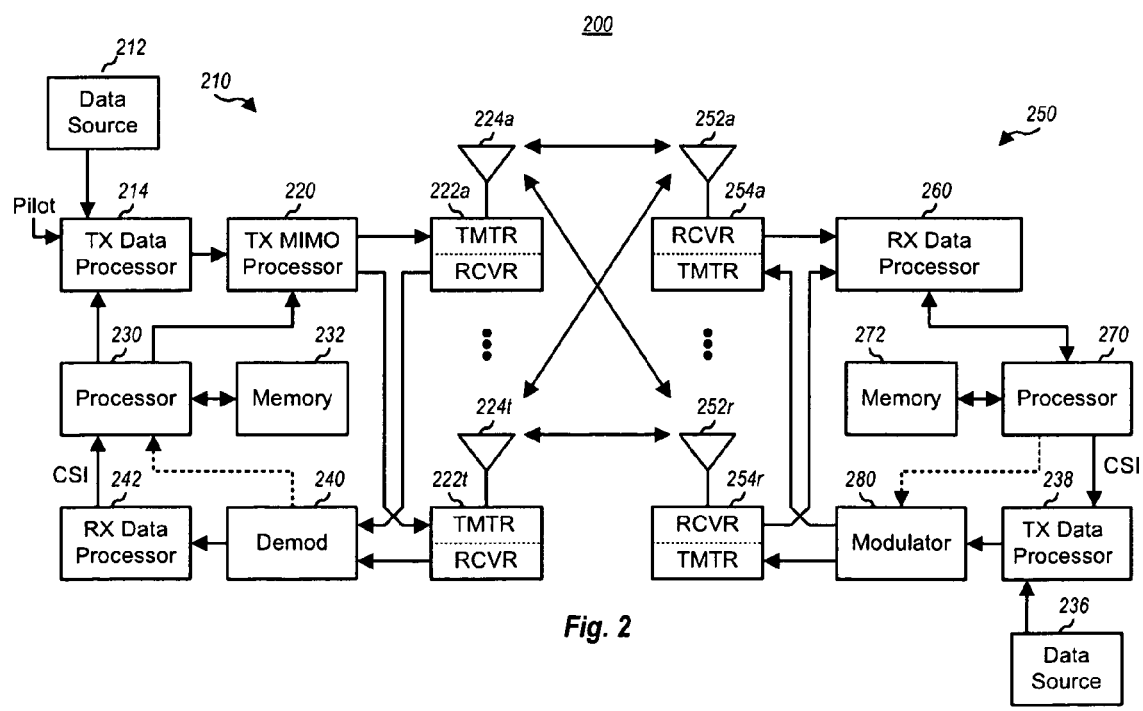
FIG. 2 is a block diagram illustrating an example of a wireless MIMO communication system.

FIG. 2 is a block diagram illustrating an example of a wireless MIMO communication system. FIG. 2 shows a transmitter system 210 (also known as an access point) and a receiver system 250 (also known as an access terminal) in a MIMO system 200. At the transmitter system 210, traffic data for a number of data streams is provided from a data source 212 to a transmit (TX) data processor 214. In one example, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides NT modulation symbol streams to NT transmitters (TMTR) 222a through 222t. In one example, the TX MIMO processor 220 applies beamforming weights to the symbols of the data streams and to the antenna from which the symbol is being transmitted. Each transmitter 222a, . . . or, 222t receives and processes a respective symbol stream to provide one or more analog signals, and further conditions (e.g., amplifies, filters, and upconverts) the analog signals to provide a modulated signal suitable for transmission over the MIMO channel. NT modulated signals from transmitters 222a through 222t are then transmitted from NT antennas 224a through 224t, respectively.

At receiver system 250, the transmitted modulated signals are received by NR antennas 252a through 252r and the received signal from each antenna 252a, . . . or 252r is provided to a respective receiver (RCVR) 254a through 254r. Each receiver 254a, . . . or 254r conditions (e.g., filters, amplifies, and downconverts) a respective received signal, digitizes the conditioned signal to provide samples, and further processes the samples to provide a corresponding "received" symbol stream.

A RX data processor 260 then receives and processes the NR received symbol streams from NR receivers 254a through 254r based on a particular receiver processing technique to provide NT "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210. A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224a through 224t, conditioned by receivers 222a through 222t, demodulated by a demodulator 240, and processed by a RX data processor 242 to extract the reserve link message transmitted by the receiver system 250. Processor 230 then determines which pre-coding matrix to use for determining the beamforming weights, then the processor 230 processes the extracted message. One skilled in the art would understand that the transceivers 222a through 222t are called transmitters in the forward link and receivers in the reverse link. Similarly, one skilled in the art would understand that the transceivers 254a through 254r are called receivers in the forward link and transmitters in the reverse link.

As a consequence of the signal format dynamics, it is challenging to have fixed hardware for multiplexing and modulation without significant overhead. In most cases, a new multiplexer and modulator design is inevitable if the wireless communication standard changes or if there is a requirement to implement a new wireless communication technique, resulting in increased time and engineering cost.

Figure 3:
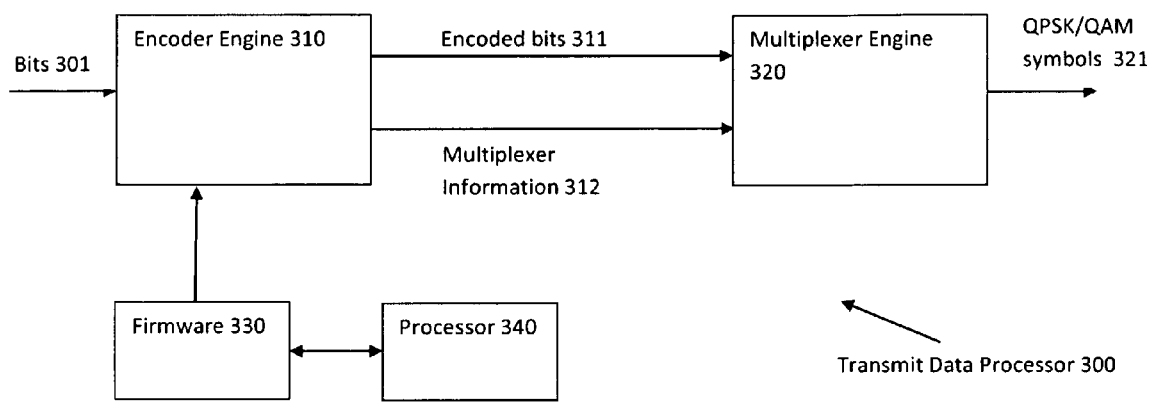
FIG. 3 is a block diagram illustrating an example of a transmit data processor with an encoder engine and a multiplexer engine for a UMB forward link.

FIG. 3 is a block diagram illustrating an example of a transmit (TX) data processor with an encoder engine and a multiplexer engine. Included in FIG. 3 is a generalized and efficient data centric multiplexer (mux) engine with the ability to handle high rate data traffic throughput and the flexibility to handle various control channels. In one example, the data centric multiplexer engine architecture includes a tile resource descriptor, tone marker, and priorities. The multiplexer (mux) engine also may be reused by the different communication standards, for example, LTE.

In one example, the common and high throughput related blocks, such as the QPSK/QAM tone modulation, are implemented in hardware, while firmware handles the modulations of low throughput control channels. Firmware controls tone/OFDM symbol resource description and resource allocation, as well as channel specific hopping. As a table driven machine, firmware has the total control and works with the hardware in a coordinated fashion to achieve a desired multiplexer operation.

In one aspect, functional partitioning is performed to allocate functions between hardware and software. Hardware implements the modulation of the forward link data channel (FLDCH) because of the very high channel throughput, which implies a more cost-effective and efficient solution in hardware, and because the data channel typically does not change over the evolution of a wireless standard. Conversely, software implements all other control channels because of the relatively low channel throughput, which can be effectively implemented in software, and because the control channels typically do change over the evolution of a wireless standard. In addition, software controls hardware through various data configurations and can support the wireless standard evolution beyond, for example, the Ultra Mobile Broadband (UMB) phase.

In another aspect, the data centric multiplexer assignment consists of two parts, one part for the pilot and one part for the data. Each resource assigned to either the pilot or the data includes a tile descriptor, buffer mode, and input buffer pointer. For the FLDCH data, the data bits are generated by the encoder engine. For the FLDCH pilot channel and all other control channels, software specifies the modulated inphase/quadrature (I/Q) symbols to be transmitted. In one example, a frequency hopping table is generated by software and downloaded to hardware. In one example, the frequency hopping table is used to assign (i.e., map) tones as a function of time. In another example, the tile allocation states which set of logical tiles are used in the assignment.

In another aspect, a tile descriptor is used as a generalized resource description. The tile definition is an N×M rectangle which is defined on a frequency (tone)-time domain, where N is the number of tones and M is the number of symbols (e.g., OFDM symbols). The allocation of tone and symbol resources (e.g., OFDM symbol resources) within a tile is arbitrary and described by a tile descriptor. In one example, tile descriptors are downloaded to hardware by software. Different types of tile descriptors may be used to best describe the resource allocation within a tile (with respect to memory usage efficiency). For example, a bitmap may be suitable for a dense tile, such as for FLDCH. For example, an index may be suitable for a sparse tile, such as for forward link cell null channel (FLCN). For example, a step may be suitable for a regular spaced tile, such as for forward link beacon channel (FLBCN).

In another aspect, there may be four frequency hopping modes to support a flexible logical to physical tone mapping. In one example, the hopping unit is a tile. Software may generate and download a hopping table to hardware. Hopping may be performed channel by channel. Four hopping modes may include, for example: no hopping (e.g., FLBCN); logical to physical tile hopping, e.g., Block Resource Channel (BRCH) hopping for FLDCH, Forward Link Control Segment (FLCS); direct physical hopping, e.g., Forward Link Preamble (FLPREAMBLE), FLCN; and Distributed Resource Channel (DRCH) hopping.

In another aspect, multiplexer job priority (i.e., channel priority) and tone markers are used to support flexible tone painting (i.e., tone mapping). In one example for UMB, a certain tone can be mapped to multiple channels. In a Skip case, the tone is occupied by a previous channel such that the following channel goes around this tone, i.e., skips the tone. For example, a FLDCH tone will go around (i.e., skip) the tones occupied by Forward Link Channel Quality Indicator (FLCQI). In a Puncture case, the tone is occupied by a previous channel and a following channel reclaims the tone, i.e., puncture out the modulated symbol generated by the previous channel. For example, a FLCN tone will only puncture the tones occupied by FLDCH data tones. In another example, to support tone skip or puncture, three parameters are implemented: 1) Channel priority: determines which channel paints (i.e., maps) on the tone first; 2) Tone markers: each tone has an associated marker (e.g., a 3 bit marker) to identify which channel occupies this tone; and 3) x-bit puncture bitmap wherein each channel has a puncture bitmap wherein x defines the number of bits. In one example, an 8 bit puncture bitmap defines that one or more previous channels can be punctured if they occupy the same tones mapped to a current channel.

In another aspect, a buffer mode is implemented. Since software downloads FLDCH pilots and control channel modulated symbols, it is important to implement a multiple buffer mode to reduce the traffic between software and hardware. A tile wrap mode handles FLDCH pilot modulated symbols. A marker only mode marks tones described by a tile descriptor without memory access to the multiplexer output I/Q symbol buffer which greatly saves multiplexer memory. As an example, the FLBCN channel only has one tone of modulated symbol, but all tones across the entire bandwidth need to be marked as occupied. This is handled by the marker only mode without doubling the multiplexer output buffer bandwidth.

In another aspect, an OFDMA resource multiplexing algorithm is used to resolve resource overlapping issues. In an OFDMA wireless system, radio resources are shared among different channels, such as pilot channels, control channels, and traffic channels. A defined multiplexing policy determines the usefulness of a specific resource (a tone or a sub-carrier) for a particular channel, and in the case a resource is already occupied, the defined multiplexing policy determines whether the occupant channel is to be punctured or to be avoided (i.e., skipped). For example, in a UMB forward link, blocks of resources allocated to FLDCH are overlapped by FLDPI or FLDPICH (forward dedicated pilot channel), FLCQICH (forward channel quality indicator pilot channel), and FLBCN (forward link beacon channel). Rather than puncturing the FLDCH (i.e., a modulating symbol being knocked out), the FLDCH gets around resources overlapped by these pilot channels and uses the next available resource. In another example, FLCN (forward link cell null channel) only uses a resource that is not occupied by any other channel (a free resource), or a resource that is occupied by FLDCH.

As illustrated in FIG. 3, the transmit data processor 300 includes an encoder engine 310 and multiplexer engine 320 which can be used, for example, in a UMB forward link. Firmware 330 associated with a processor 340 passes encoder and multiplexer information through a hardware command interface 331 to the encoder engine 310. The encoder engine 310 accepts bits 301 and encodes them into encoded bits 311 and sends them to the multiplexer engine 320. The encoder engine 310 also sends multiplexer information 312, including the multiplexing job priority and the puncture bitmap, to the multiplexer engine 320. The multiplexer engine 320 then modulates encoded bits 311 into QPSK/QAM symbols 321 and places them onto the dedicated resources (tones) according to the multiplexer information 312.

Different channels are assigned to different multiplexing jobs and are put into job queues with different priorities. To do the multiplexing, each multiplexing job has the following information. 1) Multiplexing job priority: this information dictates which channel is multiplexed first. 2) Marker: this is used to indicate the resource being occupied by which channel. An internal marker buffer holds the information for all the resources. Once a resource is occupied by the current multiplexing job, a marker will be saved to buffer for that resource. 3) Puncture bitmap: this information dictates whether the current multiplexing job can reclaim a resource which is already being occupied by previous multiplexing job with higher job priority. The marker level in the marker buffer is checked against the puncture bitmap. A "1" in the bitmap means the channel can reclaim the resource if it is occupied by a channel with corresponding marker (bit location N in bitmap corresponds to marker level N.), which results in the previous channel being punctured. Otherwise, that resource will be avoided (i.e., skipped) and the previous channel remains on that resource.

For example, in the UMB wireless system, the following channels are required for transmit frame N: 1) FLBCN (forward beacon channel); 2) FLDPI (forward dedicated pilot channel); 3) FLDCH (forward data channel); and 4) FLCN (forward cell null channel). In the UMB example and in accordance with the UMB specification, FLBCN is first. In addition, FLDPI needs to avoid (i.e., skip) resources occupied by FLBCN, and FLDCH needs to avoid (i.e., skip) resources occupied by both FLBCN and FLDPI. FLCN can only puncture (i.e., reclaim) the resources occupied by FLDCH and must avoid (i.e., skip) resources occupied by the other channels. In one example, the appropriate priority, marker and puncture bitmap for each channel in the firmware is assigned to satisfy the UMB requirement.

In one aspect, the data centric multiplexer has eight job priorities, and uses three bits for the marker and eight bits for the puncture bitmap: 1) FLDCH: priority 1, marker 1, puncture bitmap 00000010b; 2) FLCN: priority 0 (lowest), marker 2, puncture bitmap 00000010b; 3) FLBCN: priority 7 (highest), marker 7, puncture bitmap 11111111b; and 4) FLDPI: priority 2, marker 4, puncture bitmap 00010000b.

Figure 4:
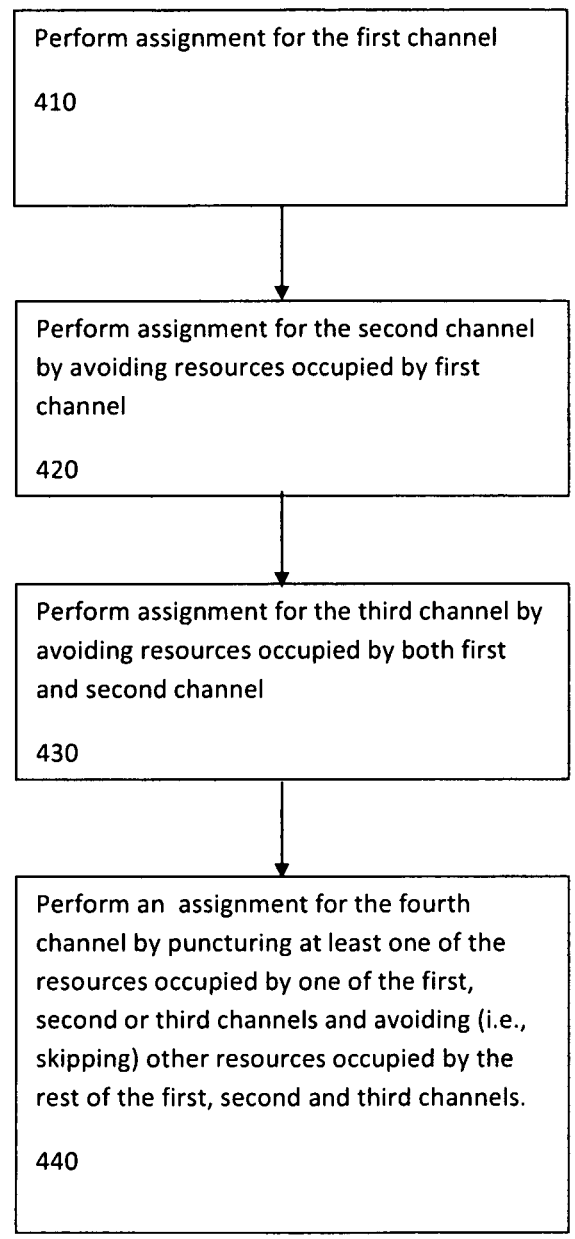
FIG. 4 illustrates an example process flow diagram for resource multiplexing to resolve resource overlapping issues in a wireless communication system.

FIG. 4 illustrates an example process flow diagram for resource multiplexing to resolve resource overlapping issues in a wireless communication system with a plurality of channels. In one example, there are four channels. Predetermine the channel (e.g., first channel) with the highest priority, followed by three other channels (second channel, third channel and fourth channel) with predetermined priorities. In block 410, perform assignment for the first channel by assigning a first resource to a first of the plurality of channels. Following block 410, in block 420, perform assignment for the second channel by avoiding resources occupied by first channel. That is, assign a second resource to a second of the plurality of channels wherein the second resource is not the first resource. Following block 420, in block 430, perform assignment for the third channel by avoiding resources occupied by both first and second channel. That is, assign a third resource to a third of the plurality of channels wherein the third resource is not the first or the second resource. Following block 430, in block 440, perform an assignment for the fourth channel by puncturing at least one of the resources occupied by one of the first, second or third channels and avoiding (i.e., skipping) other resources occupied by the rest of the first, second and third channels. That is, assign a fourth resource to a fourth of the plurality of channels by puncturing at least one of the first, second or third resources and skipping the rest of the unpunctured first, second or third resources. One skilled in the art would understand that although the example of FIG. 4 is illustrated with four channels, that other quantity of channels can be substituted without affecting the scope or spirit of the present disclosure.

Figure 5:
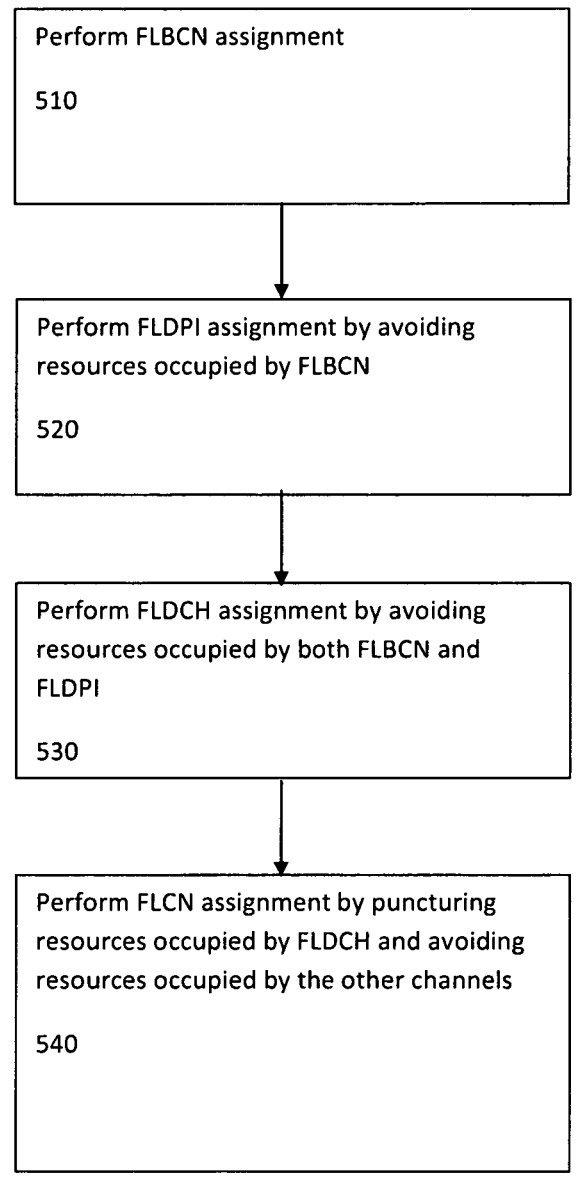
FIG. 5 illustrates an example process flow diagram for resource multiplexing to resolve resource overlapping issues in an OFDMA system.

FIG. 5 illustrates an example process flow diagram for resource multiplexing to resolve resource overlapping issues in an OFDMA system. In this example, the highest priority is for the FLBCN, followed by FLDPI, FLDCH, and FLCN, in the order listed. In block 510, perform FLBCN assignment first. Following block 510, in block 520, perform FLDPI assignment by avoiding resources occupied by FLBCN. Following block 520, in block 530, perform FLDCH assignment by avoiding resources occupied by both FLBCN and FLDPI. Following block 530, in block 540, perform FLCN assignment by puncturing resources occupied by FLDCH and avoiding resources occupied by the other channels. One skilled in the art would understand that although the example of FIG. 5 is illustrated with four particular channels (FLBCN, FLDPI, FLDCH, and FLCN), that other channels or other quantities of channels can be substituted without affecting the scope or spirit of the present disclosure.

One skilled in the art would understand that the steps disclosed in the example flow diagram in FIGS. 4 and 5 can be interchanged in their order without departing from the scope and spirit of the present disclosure. Also, one skilled in the art would understand that the steps illustrated in the flow diagram are not exclusive and other steps may be included or one or more of the steps in the example flow diagram may be deleted without affecting the scope and spirit of the present disclosure Those of skill would further appreciate that the various illustrative components, logical blocks, modules, circuits, and/or algorithm steps described in connection with the examples disclosed herein may be implemented as electronic hardware, firmware, computer software, or combinations thereof. To clearly illustrate this interchangeability of hardware, firmware and software, various illustrative components, blocks, modules, circuits, and/or algorithm steps have been described above generally in terms of their functionality. Whether such functionality is implemented as hardware, firmware or software depends upon the particular application and design constraints imposed on the overall system. Skilled artisans may implement the described functionality in varying ways for each particular application, but such implementation decisions should not be interpreted as causing a departure from the scope or spirit of the present disclosure.

For example, for a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described therein, or a combination thereof. With software, the implementation may be through modules (e.g., procedures, functions, etc.) that performs the functions described therein. The software codes may be stored in memory units and executed by a processor unit. Additionally, the various illustrative flow diagrams, logical blocks, modules and/or algorithm steps described herein may also be coded as computer-readable instructions carried on any computer-readable medium known in the art or implemented in any computer program product known in the art.

Figure 6:
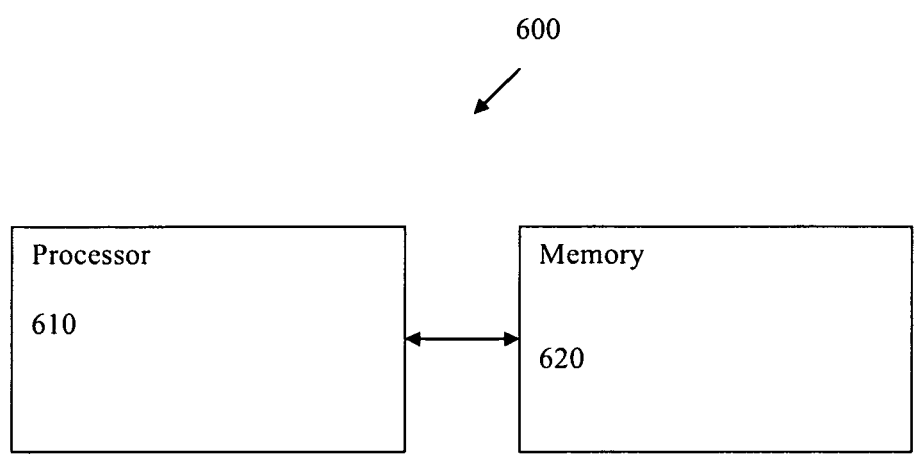
FIG. 6 illustrates an example of an apparatus useful in accord with the present disclosure

In one example, the illustrative components, flow diagrams, logical blocks, modules and/or algorithm steps described herein are implemented or performed with one or more processors. In one aspect, a processor is coupled with a memory which stores data, metadata, program instructions, etc. to be executed by the processor for implementing or performing the various flow diagrams, logical blocks and/or modules described herein. FIG. 6 illustrates an example of a device 600 comprising a processor 610 in communication with a memory 620 for data centric multiplexing, for example, in a wireless communication system. In one example, the device 600 is used to implement the algorithm illustrated in either FIG. 4 or 5. In one aspect, the memory 620 is located within the processor 610. In another aspect, the memory 620 is external to the processor 610. In one aspect, the processor includes circuitry for implementing or performing the various flow diagrams, logical blocks and/or modules described herein.

Figure 7:
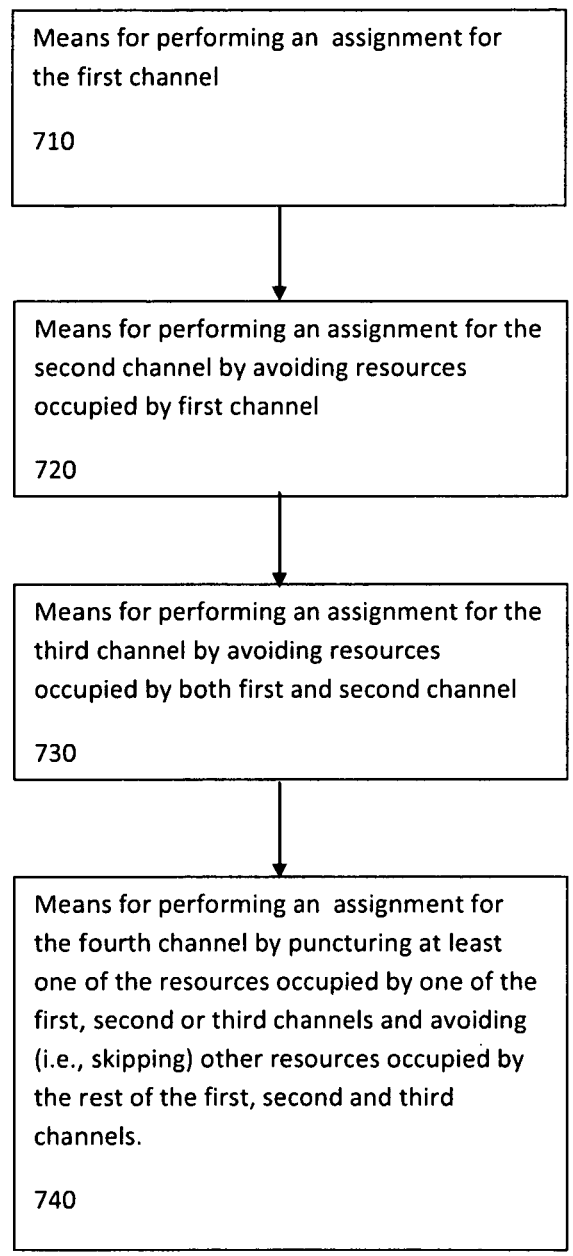
FIG. 7 illustrates an example of a device 700 suitable for data centric multiplexing, for example, in a wireless communication system.

FIG. 7 illustrates an example of a device 700 suitable for data centric multiplexing, for example, in a wireless communication system. In one aspect, the device 700 is implemented by at least one processor comprising one or more modules configured to provide different aspects of for data centric multiplexing as described herein in blocks 710, 720, 730 and 740. For example, each module comprises hardware, firmware, software, or any combination thereof. In one aspect, the device 700 is also implemented by at least one memory in communication with the at least one processor.

Figure 8:
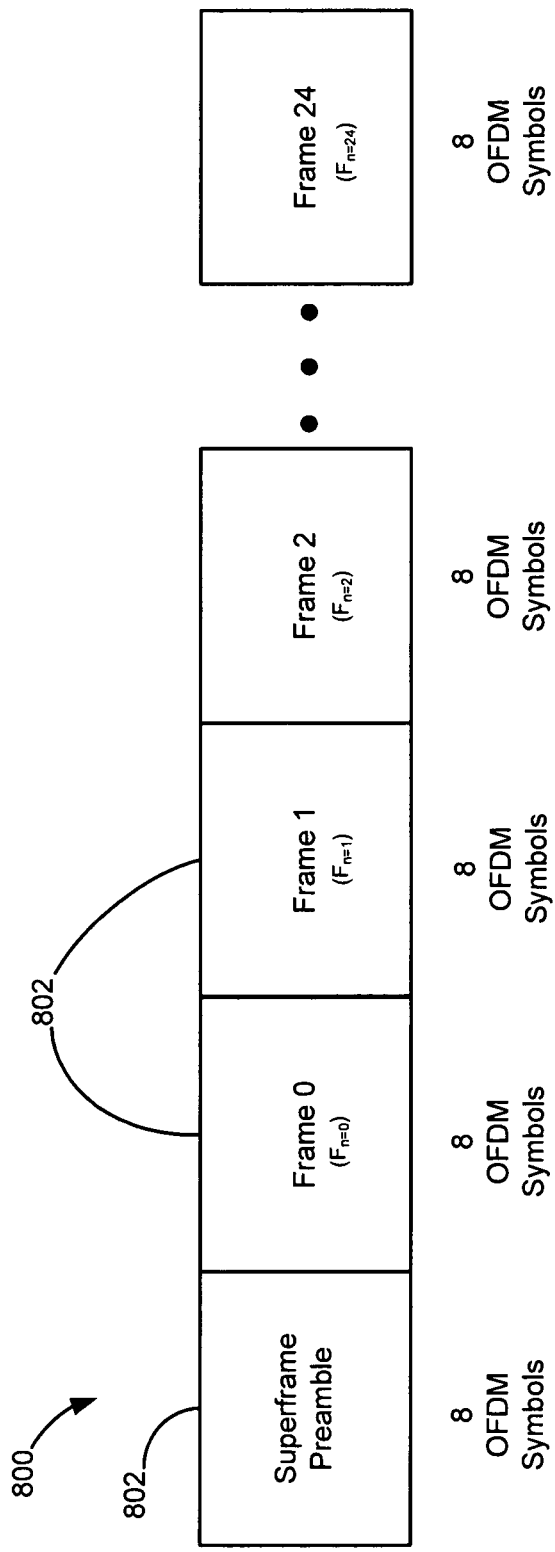
FIG. 8 is a diagram of a superframe.

Referring now to FIG. 8, a UMB superframe 800 is illustrated. The superframe comprises a preamble frame 802 followed by a sequence of forward link physical frames $F_n$ 804 where n=1-24, all of which may be separated by a guard interval (not illustrated in FIG. 8). Each frame of superframe 800 comprises eight (8) OFDM symbols. Generally speaking, each of the individual frames includes information relating to a particular transmission, including audio and video data and overhead information. Stated otherwise, in UMB a frame is a unit of time equal to 8 OFDM symbols.

Different channels start and end at different times in a superframe and its individual frames. For example, forward link data channels (FLDCH) always start and end on frame boundaries. However there are many control channels (FLCQICH, FLBCH) that begin and end in the middle of a frame. For instance the FLCQICH channel is transmitted on symbols 3 and 4 of a frame.

In a typical transmitter configuration, firmware included within the apparatus submits an encode/multiplex job for a control channel, such as the forward channel quality indicator pilot channel, just in time, say on symbol 2 of the frame, so that the job can be included on symbols 3 and 4 of the frame. This "just in time" relationship results in a tight coupling between apparatus firmware and apparatus hardware, in turn complicating the firmware design.

To reduce the complexity of such configurations, it would be desirable if the apparatus firmware and hardware were coarsely synchronized to the pertinent frame, rather than to a particular symbol of that frame. Stated otherwise, it would be preferable if there existed a coarse synchronization of encoded OFDM symbols, outputted by an encoder and provided to a queue (or memory) associated with a multiplexer, to a frame rather than to the particular frame symbol itself, thereby enabling the multiplexer to properly configure the symbols into the appropriate frame.

Further, in accord with the disclosures herein, a firmware module can output push an encode/multiplex job into a job FIFO queue as long as this job is destined to be muxed out in the next frame. The encoder module continuously pops encode/multiplex jobs out of its FIFO and processes them. Once the encoder finishes with the job, it pushes the job into a pending queue feeding the multiplexer.

Each encode/multiplex job is associated with a job descriptor that has among its fields, for each identified frame, a startSymbol and a numSymbol, which describe the job. The startSymbol is a number between 0 and 7 that indicates at which symbol the job becomes active and the numSymbol is a number that indicates the number of symbols the job remains active once it has started.

Thus, for example, an encode/multiplex job for the FLCQICH channel, which as noted above is transmitted on third and fourth symbols of a frame, the job descriptor will include a startSymbol of 2 and a numSymbol of 2.

For every frame to be multiplexed by the multiplexer, the multiplexer will inspect all the jobs in the pending queues and push jobs whose startSymbol matches the current symbol number into one of the active queues. Multiple active queues may be utilized and ordered by priority, although only one such active queue is illustrated here for purposes of simplicity. In addition, the multiplexer also processes all the jobs that are present in the active queues in the order of their priority. It decrements the numSymbols count on each job that it has processed. Finally it inspects all the active queues and removes all the jobs that have expired, that is when the corresponding numSymbols count has reached zero.

Thus by providing pending and active job queues at the interface between the encoder and the multiplexer, the synchronization constraints between the encoder/multiplexer HW blocks and the firmware have been loosened.

Figure 9:
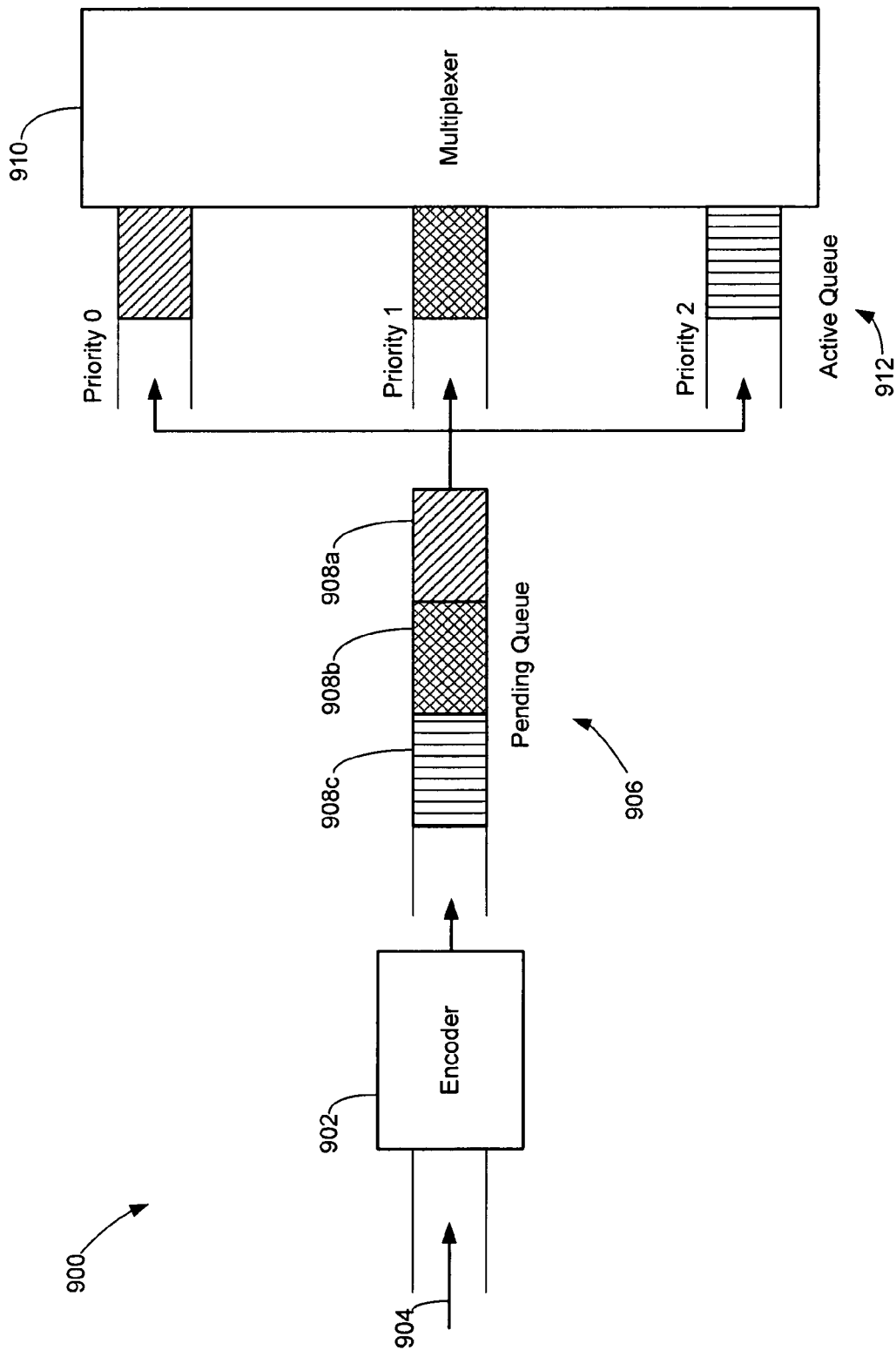
FIG. 9 is a block diagram of illustrating the relationship of an encoder and multiplexer in accord with the disclosures herein.

FIG. 9 illustrates an embodiment 900 in accord with the disclosures herein. Thus there is illustrated an encoder 902 receiving jobs 904 (for example, bits 301 of FIG. 3) which processes the job as previously described herein, but in addition providing a job descriptor (for example, multiplexer information 312 of FIG. 3) inclusive of the previously described startSymbol and numSymbol. The output of the encoder 902 is provided to a pending queue 906. For simplicity of illustration, only three encoded OFDM symbols 908a, 908b, and 908c, for a particular frame of a superframe are illustrated.

Also shown in the Figure is a multiplexer 910 (for example multiplexer 320 of FIG. 3) and an active queue 912. The symbols 908 are placed into an active queue on the basis of their priority as described above and multiplexed accordingly. That is, each of the jobs or symbols 908 will be examined to determine if they should be multiplexed into the same frame. If the jobs are from the same frame they will be moved from the pending queue 906 into the active queue 912 for processing of that frame by multiplexer 910.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves The previous description of the disclosed aspects is provided to enable any person skilled in the art to make or use the present disclosure. Various modifications to these aspects will be readily apparent to those skilled in the art, and the generic principles defined herein may be applied to other aspects without departing from the spirit or scope of the disclosure.

What is claimed is:

1. An apparatus operable in wireless communication system, the apparatus comprising:
   means for synchronizing an encoder and a multiplexer up to a frame;
   means for pushing jobs from the encoder into a pending queue;
   means for determining if the jobs in the pending queue are from a same frame based on job descriptor information associated with each job in the pending queue;
   means for pushing jobs from the pending queue to an active queue if the jobs are from the same frame; and
   means for multiplexing the jobs from the same frame.

2. An apparatus operable in wireless communication system, the apparatus comprising:
   means for synchronizing an encoder and a multiplexer up to a frame;
   means for pushing jobs from the encoder into a pending queue;
   means for determining if the jobs in the pending queue are from the frame;
   means for pushing jobs from the pending queue to an active queue if the jobs are from the same frame; and
   means for multiplexing the jobs from the same frame;
   wherein a frame comprises eight symbols and each job has associated therewith:
   a job descriptor including a startSymbol and a numSymbol, wherein the startSymbol is a number between 0 and 7 that indicates at which symbol the job becomes active and the numSymbol is a number that indicates the number of symbols the job remains active once it has started.

3. The apparatus of claim 2 wherein the means for determining if the jobs in the pending queue are from the frame examines the job descriptors of the jobs in the pending queue to determine if the jobs are from the same frame.

4. A method used in wireless communication system, the method comprising:
synchronizing an encoder and multiplexer up to a frame;
providing a pending job queue;
pushing jobs from the encoder into the pending queue;
determining if the jobs in the pending queue are from a same frame based on job descriptor information associated with each job in the pending queue;
providing an active job queue;
pushing jobs from the pending queue to the active queue if the jobs are from the same frame; and
multiplexing the jobs in the active queue.

5. A method used in wireless communication system, the method comprising:
synchronizing an encoder and a multiplexer up to a frame;
providing a pending job queue;
pushing jobs from the encoder into the pending queue;
determining if the jobs in the pending queue are from the frame;
providing an active job queue;
pushing jobs from the pending queue to the active queue if the jobs are from the same frame; and
multiplexing the jobs in the active queue;
wherein a frame comprises eight symbols and further including:
providing a job descriptor for each job including a startSymbol and a numSymbol, wherein the startSymbol is a number between 0 and 7 that indicates at which symbol the job becomes active and the numSymbol is a number that indicates the number of symbols the job remains active once it has started.

6. The method of claim 5 wherein the step of determining if the jobs in the pending queue are from the frame comprises examining the job descriptors of the jobs in the pending queue to determine if the jobs are from the same frame.

7. An electronic device configured to execute the method of claim 4.

8. A non-transitory machine-readable medium comprising instructions which, when executed by a machine, cause the machine to perform operations including:
synchronizing an encoder and a multiplexer up to a frame;
pushing jobs from the encoder into a pending queue;
determining if the jobs in the pending queue are from a same frame based on job descriptor information associated with each job in the pending queue;
pushing jobs from the pending queue to an active queue if the jobs are from the same frame; and
multiplexing the jobs from the same frame.

9. A non-transitory machine-readable medium comprising instructions which, when executed by a machine, cause the machine to perform operations including:
synchronizing an encoder and a multiplexer up to a frame;
pushing jobs from the encoder into a pending queue;
determining if the jobs in the pending queue are from the frame;
pushing jobs from the pending queue to an active queue if the jobs are from the same frame; and
multiplexing the jobs from the same frame;
wherein each job includes a job descriptor including a startSymbol and a numSymbol, wherein the startSymbol is a number between 0 and 7 that indicates at which symbol the job becomes active and the numSymbol is a number that indicates the number of symbols the job remains active once it has started.

10. The non-transitory machine-readable medium of claim 9 wherein the step of determining if the jobs in the pending queue are from the frame comprises examining the job descriptors of the jobs in the pending queue to determine if the jobs are from the same frame.

11. An apparatus operable in a wireless communication system, the apparatus comprising a processor, an encoder, and a multiplexer and pending and active queues at an interface between said encoder and said multiplexer, wherein said processor is configured to:
synchronize the encoder and the multiplexer up to a frame;
push jobs from the encoder into the pending queue;
determine if the jobs in the pending queue are from a same frame based on job descriptor information associated with each job in the pending queue;
push jobs from the pending queue to the active queue if the jobs are from the same frame; and
multiplex the jobs from the same frame; and
a memory coupled to the processor for storing the jobs in the pending and active queues.

12. An apparatus operable in a wireless communication system, the apparatus comprising a processor, an encoder, and a multiplexer and pending and active queues at an interface between said encoder and said multiplexer, wherein said processor is configured to:
synchronize the encoder and the multiplexer up to a frame;
push jobs from the encoder into the pending queue;
determine if the jobs in the pending queue are from the frame;
push jobs from the pending queue to the active queue if the jobs are from the same frame; and
multiplex the jobs from the same frame; and
a memory coupled to the processor for storing the jobs in the pending and active queues;
wherein each job includes a job descriptor including a startSymbol and a numSymbol, wherein the startSymbol is a number between 0 and 7 that indicates at which symbol the job becomes active and the numSymbol is a number that indicates the number of symbols the job remains active once it has started.

13. The apparatus of claim 12 and wherein the processor is further configured to:
examine the job descriptors of the jobs in the pending queue to determine if the jobs are from the same frame.

* * * * *